United States Patent
Mizusaki et al.

(10) Patent No.: US 10,816,393 B2
(45) Date of Patent: Oct. 27, 2020

(54) PHOTOELECTRIC SENSOR CAPABLE OF SUPPRESSING CABLE BREAKAGE

(71) Applicant: OMRON Corporation, Kyoto (JP)

(72) Inventors: Hiroyuki Mizusaki, Kyoto (JP); Tomohiro Tsuji, Kyoto (JP); Jumpei Nakamura, Kyoto (JP); Tsuyoshi Miyata, Kyoto (JP)

(73) Assignee: OMRON Corporation, Kyoto (JP)

( * ) Notice: Subject to any disclaimer, the term of this patent is extended or adjusted under 35 U.S.C. 154(b) by 34 days.

(21) Appl. No.: 16/275,328

(22) Filed: Feb. 14, 2019

(65) Prior Publication Data

US 2019/0285464 A1 Sep. 19, 2019

(30) Foreign Application Priority Data

Mar. 15, 2018 (JP) .................. 2018-048007

(51) Int. Cl.
| | |
|---|---|
| *G01J 1/02* | (2006.01) |
| *G01J 1/42* | (2006.01) |
| *G01S 7/481* | (2006.01) |
| *G01V 8/12* | (2006.01) |
| *G01S 17/04* | (2020.01) |

(52) U.S. Cl.
CPC .............. *G01J 1/0271* (2013.01); *G01J 1/42* (2013.01); *G01S 7/4813* (2013.01); *G01S 17/04* (2020.01); *G01V 8/12* (2013.01)

(58) Field of Classification Search
CPC ........... G01J 1/0271; G01J 1/42; G01S 17/04; G01S 7/4813; G01V 8/12
USPC ........................................ 250/221, 551, 239
See application file for complete search history.

(56) References Cited

U.S. PATENT DOCUMENTS

| | | | | |
|---|---|---|---|---|
| 4,021,665 A | * | 5/1977 | Haas ....................... | H01L 31/16 250/239 |
| 4,282,430 A | * | 8/1981 | Hatten ..................... | G01C 3/10 250/221 |
| 4,967,069 A | * | 10/1990 | Yamakawa ...... | G01N 21/95684 250/221 |
| 2017/0254698 A1 | | 9/2017 | Mizusaki et al. | |

FOREIGN PATENT DOCUMENTS

| | | |
|---|---|---|
| CN | 107155276 | 9/2017 |
| JP | 2001336929 | 12/2001 |
| JP | 2007073417 | 3/2007 |

OTHER PUBLICATIONS

"Search Report of Europe Counterpart Application", dated Aug. 1, 2019, pp. 1-8.
"Office Action of China Counterpart Application", dated Jul. 3, 2020, with English translation thereof, p. 1-p. 15.

* cited by examiner

*Primary Examiner* — Que Tan Le
(74) *Attorney, Agent, or Firm* — JCIPRNET

(57) ABSTRACT

A photoelectric sensor capable of suppressing breakage of a cable connected to a case body is provided. The photoelectric sensor includes a case body having an accommodation space which accommodates at least one of a light projecting portion and a light receiving portion therein, and a cable which accommodates a cord connected via a control portion to at least one of the light projecting portion and the light receiving portion, and a concave portion recessed toward an inside of the case body is provided in an outer surface of the case body, and the cable is mounted in the concave portion.

12 Claims, 5 Drawing Sheets

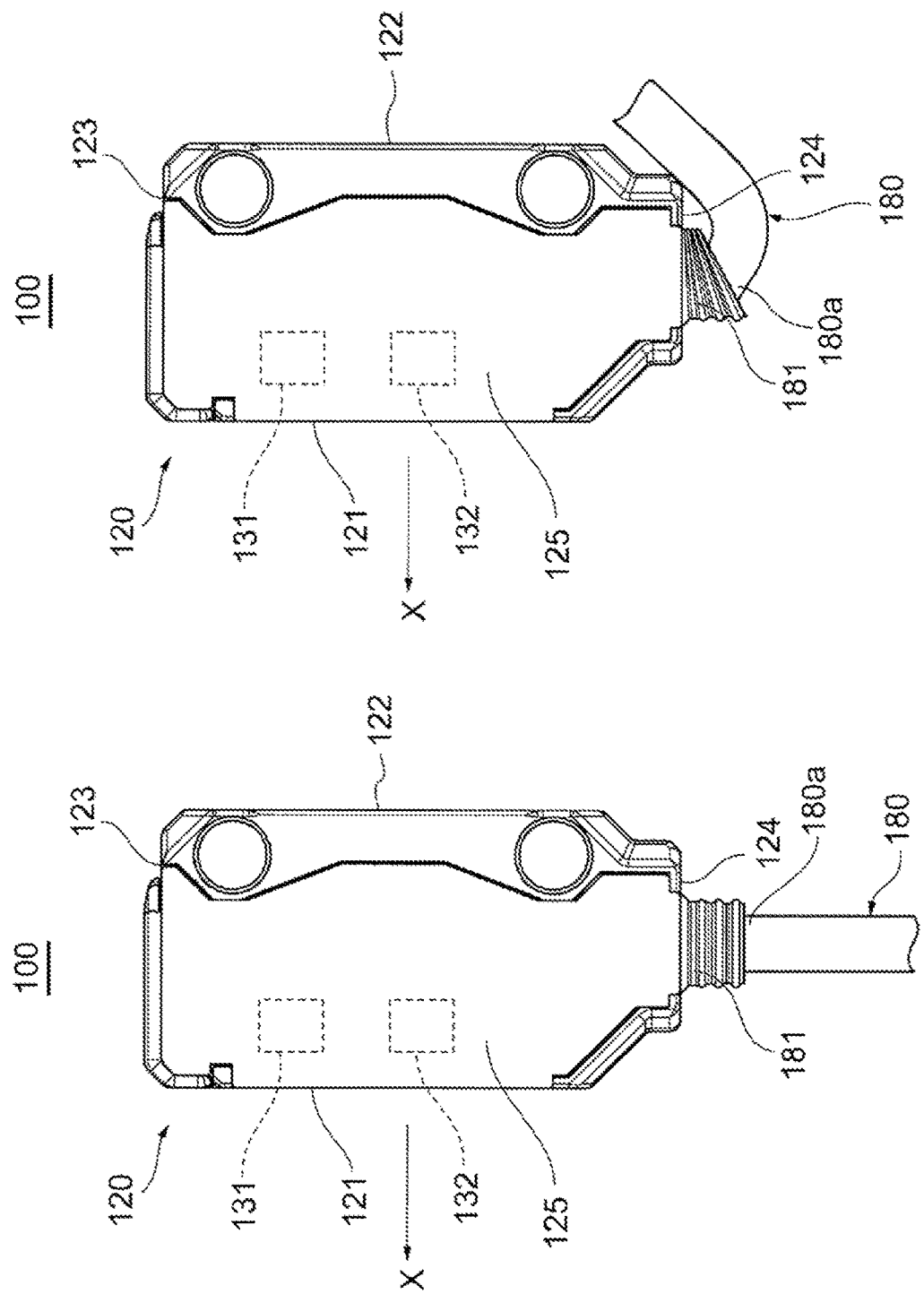

PHOTOELECTRIC SENSOR CAPABLE OF SUPPRESSING CABLE BREAKAGE

CROSS-REFERENCE TO RELATED APPLICATION

This application claims the priority of Japan patent application serial no. 2018-048007, filed on Mar. 15, 2018. The entirety of the above-mentioned patent application is hereby incorporated by reference herein and made a part of this specification.

BACKGROUND

Technical Field

The disclosure relates to a photoelectric sensor.

Description of Related Art

A photoelectric sensor is used as an apparatus which detects the presence or absence of an object in a detection region, a surface condition of an object, and the like. As a photoelectric sensor, for example, there is a photoelectric sensor in which a light projecting portion for emitting light and a light receiving portion for receiving light are accommodated inside a case (hereinafter referred to as a case body).

In a photoelectric sensor of the following Patent Document 1 (Japanese Laid-Open No. 2007-073417), a mounting board on which electronic components (a light projecting element, a light receiving element, and the like) constituting a light projecting and receiving portion, electronic components constituting a signal processing portion and the like are mounted, a lens and the like are accommodated inside the case body. The case body has an opening portion through which detection light emitted from the light projecting portion and return light received by the light receiving portion pass. Also, for example, a cable which supplies power from the outside of the photoelectric sensor to the mounting board and transmits a signal processed by a light receiving circuit to the outside of the photoelectric sensor is connected to the case body.

However, in the photoelectric sensor used for production equipment or the like, the cable connected to the case body may be used in a bent state due to restriction of an installation space. According to an installation location of the photoelectric sensor and the installation space thereof, the cable may be installed in a state in which it is bent along the case body (refer to, for example, FIG. 5(B)). In this case, a load applied to a portion of the cable (a root of the cable) connected to the case body becomes excessive, and there is a possibility of breakage.

SUMMARY

A photoelectric sensor according to an embodiment of the disclosure is a photoelectric sensor having at least one of a light projecting portion which emits light to a front space and a light receiving portion which receives light from a front zone, and the photoelectric sensor including a case body having an accommodation space which accommodates at least one of the light projecting portion and the light receiving portion therein, and a cable which accommodates a cord connected via a control portion to at least one of the light projecting portion and the light receiving portion, wherein a concave portion which is recessed toward an inside of the case body is provided in an outer surface of the case body, and the cable is mounted in the concave portion.

BRIEF DESCRIPTION OF THE DRAWINGS

FIGS. 5(A) and 5(B) are views for explaining an example of an installation mode of a conventional photoelectric sensor.

DESCRIPTION OF THE EMBODIMENTS

Figure 1:
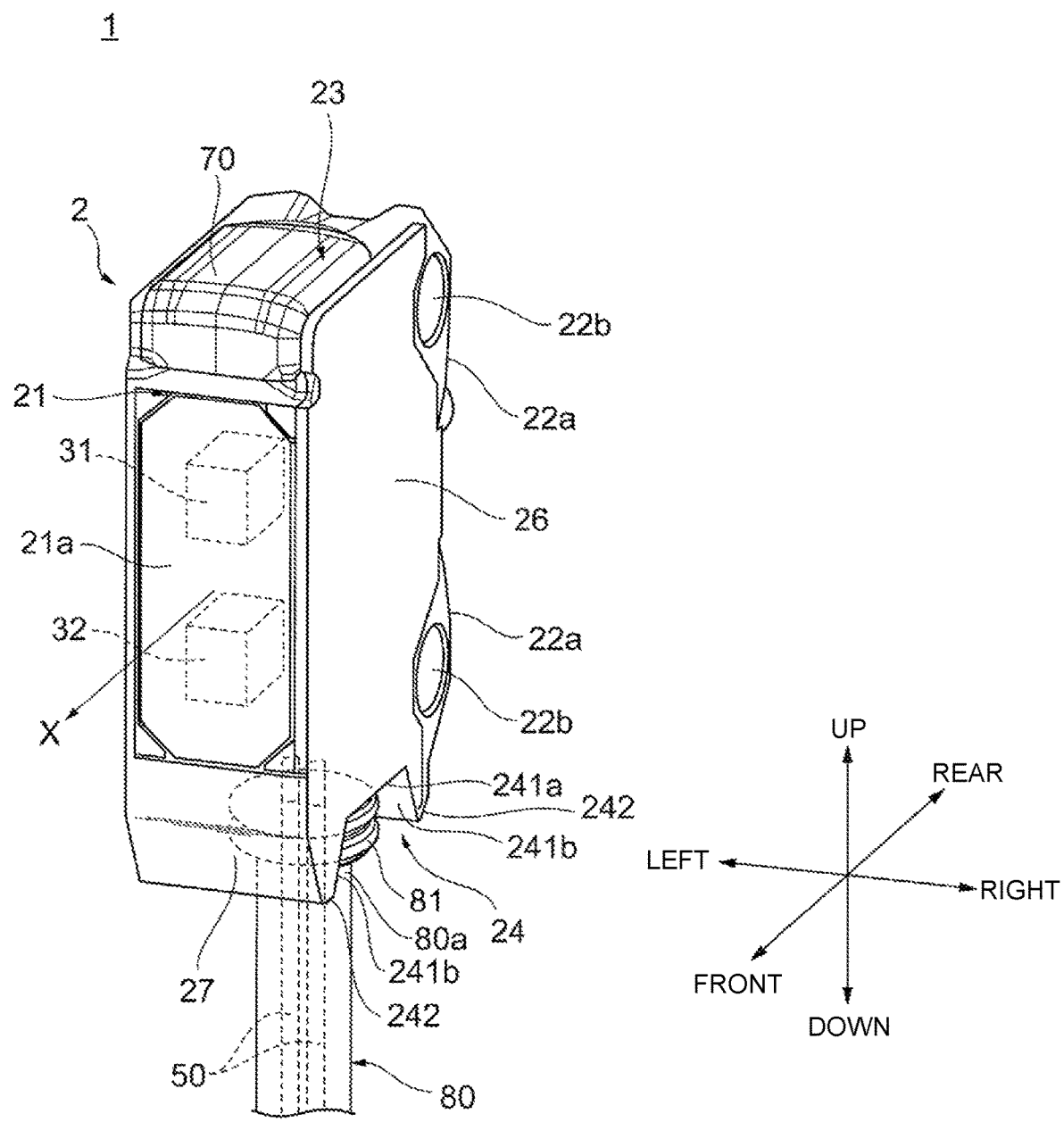
FIG. 1 is a perspective view of a photoelectric sensor according to an embodiment when seen from one direction.

Therefore, the disclosure provides a photoelectric sensor capable of suppressing breakage of a cable connected to a case body.

A photoelectric sensor according to an embodiment of the disclosure is a photoelectric sensor having at least one of a light projecting portion which emits light to a front space and a light receiving portion which receives light from a front zone, and the photoelectric sensor including a case body having an accommodation space which accommodates at least one of the light projecting portion and the light receiving portion therein, and a cable which accommodates a cord connected via a control portion to at least one of the light projecting portion and the light receiving portion, wherein a concave portion which is recessed toward an inside of the case body is provided in an outer surface of the case body, and the cable is mounted in the concave portion.

According to the embodiment of the disclosure, since the cable is mounted in the concave portion which is recessed toward the inside of the case body, a portion of the cable connected to the case body (hereinafter, also referred to as a cable connection portion) is located in the concave portion. Therefore, when the cable is bent, the cable can be brought into contact with a part of the case body (the periphery of the concave portion in the case body) to limit a bending angle of the cable, and it is possible to suppress excessive bending from the cable connection portion. As a result, it is possible to suppress a load applied to the cable connection portion, and it is possible to suppress breakage of the cable.

According to an embodiment of the disclosure, the concave portion may be provided on one of outer surfaces of the case body other than a front surface having a light projecting and receiving surface through which the light from the light projecting portion and the light to the light receiving portion pass.

According to the embodiment of the disclosure, since the cable is mounted in the concave portion formed in a surface of the case body other than the front surface, when the cable is bent, the cable can be brought into contact with a portion located in the periphery of the concave portion, and excessive bending from the cable connection portion can be suppressed.

According to an embodiment of the disclosure, the concave portion may be provided on a surface which connects the front surface and a rear surface located on a side opposite to the front surface.

According to the embodiment of the disclosure, when the cable is bent, the cable can be brought into contact with a portion of a surface connecting the front surface and the rear surface which is located in the periphery of the concave portion, and it is possible to suppress excessive bending from the cable connection portion.

According to an embodiment of the disclosure, the case body may have a rear surface located on a side opposite to the front surface, a protruding portion having a shape protruding rearward may be provided on an upper side and a lower side with respect to a center portion of the rear surface, and the cable may be mounted on the center portion of the rear surface.

According to the embodiment of the disclosure, since the protruding portion protruding rearward is provided on the upper side and the lower side of the center portion on which the cable is mounted, when the cable is bent, the cable can be brought into contact with the protruding portion to limit a bending angle of the cable.

According to an embodiment of the disclosure, a cable protection member which covers a periphery of an end portion of the cable may be provided at the end portion of the cable, and the end portion of the cable and the cable protection member may be located in the concave portion.

According to the embodiment of the disclosure, since the cable protection member which covers the end portion of the cable and the periphery of the end portion is located in the concave portion, when the cable is bent, the bending angle of the end portion of the cable and the cable protection member is limited. As a result, it is possible to further suppress the load applied to the cable connection portion.

According to an embodiment of the disclosure, the concave portion may be partitioned by a bottom wall and a pair of side walls, and the pair of side walls may be inclined surfaces which are inclined with respect to the bottom wall.

According to the embodiment of the disclosure, since the periphery of the cable connection portion is covered with the side walls formed of the inclined surfaces, when the cable is bent, the cable can be gently bent along the inclined surfaces while the bending angle of the cable is limited.

According to embodiments of the disclosure, it is possible to provide a photoelectric sensor capable of suppressing breakage of a cable connected to a case body.

A photoelectric sensor according to a preferred embodiment of the disclosure will be described with reference to the accompanying drawings. For convenience of explanation, directions such as front, rear, left, right, up and down are described with reference to FIGS. 1 and 2. In each of the drawings, components designated by the same reference numerals have the same or similar configurations.

The configuration of the photoelectric sensor according to the embodiment will be described with reference to FIGS. 1 to 3(B). As shown in FIGS. 1 to 3(B), a photoelectric sensor 1 includes a substantially rectangular parallelepiped case body 2.

The case body 2 has an accommodating space therein for accommodating a light projecting portion 31, a light receiving portion 32, and the like. Hereinafter, although an example in which the light projecting portion 31 and the light receiving portion 32 are accommodated in the case body 2 is described, the disclosure is not limited to the illustrated example. In the embodiment, at least one of the light projecting portion 31 and the light receiving portion 32 may be accommodated in the case body 2. That is, the photoelectric sensor of the embodiment also includes a mode in which the light projecting portion 31 and the light receiving portion 32 are accommodated in separate case bodies.

The light projecting portion 31 projects light onto an object to be detected, and includes a light projecting element and a light projecting lens. The light projecting element is, for example, a laser diode, and an optical axis X thereof is parallel in front and rear directions.

The light receiving portion 32 receives reflected light of the light projected onto the object to be detected and has a light receiving element and a light receiving lens. The light receiving element is, for example, a two-part photodiode or a position detecting element. For example, a principle of time of flight (TOF) or a principle of triangulation can be used as a detection principle of distance measurement for obtaining a distance to the object to be detected. For example, when the principle of triangulation is used in the above configuration, light emitted from the light projecting element passes through the light projecting lens and is projected onto the object to be detected, and light reflected by the object to be detected passes through the light receiving lens and forms an image on the light receiving element. The light receiving element outputs two light receiving signals corresponding to an imaging position and transmits the light receiving signals to a control circuit via an amplifier. The amplifier and the control circuit are incorporated in the photoelectric sensor 1, and in the control circuit, a position signal value calculated from the two received light signals is compared with a threshold value, and the distance to the object to be detected is obtained.

Figure 2:
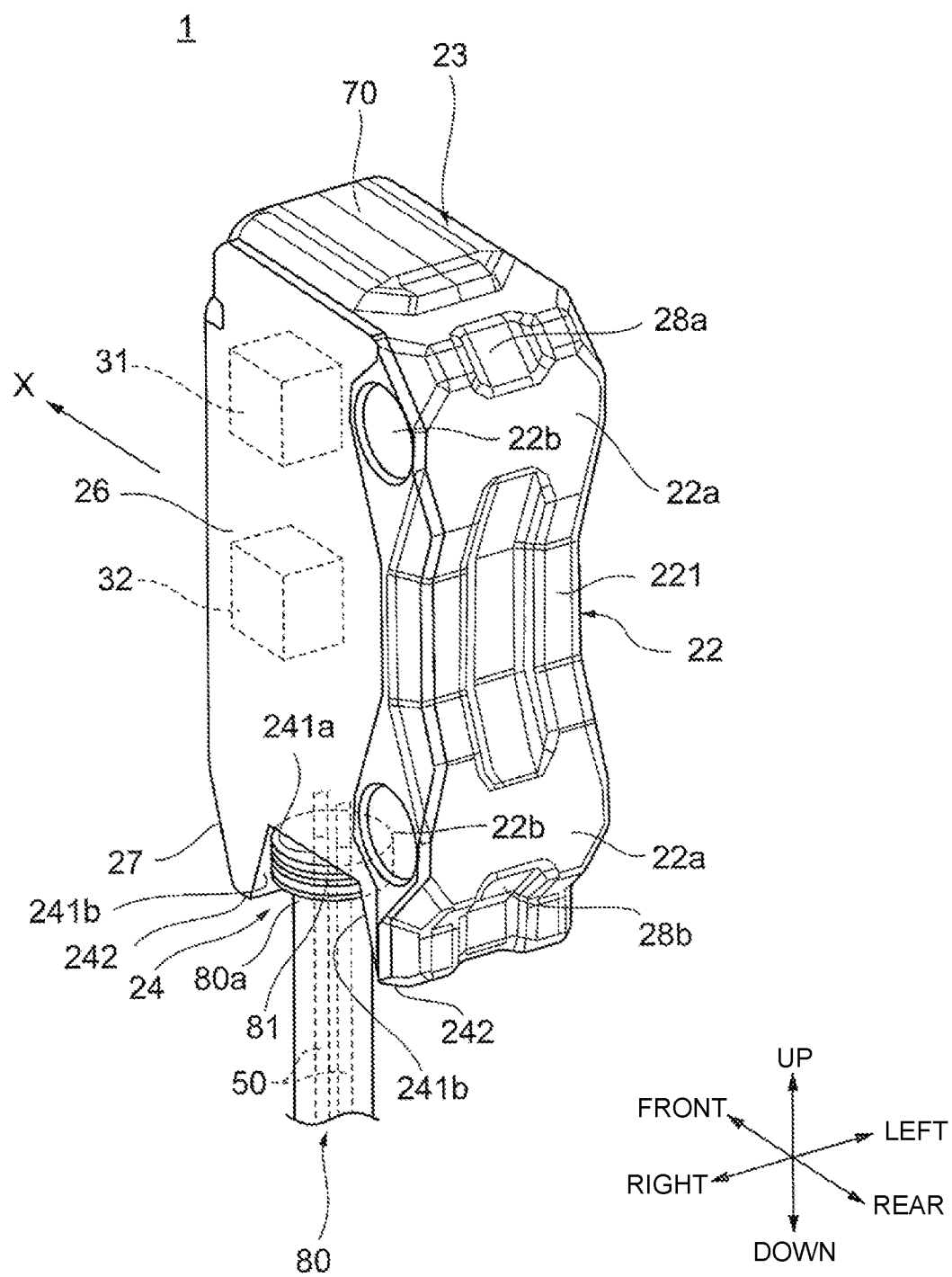
FIG. 2 is a perspective view of the photoelectric sensor of FIG. 1 when seen from another direction.

The case body 2 is formed of a resin or a metal, for example. The case body 2 has six surfaces constituting a rectangular parallelepiped, including a front surface 21, a rear surface 22, a top surface 23, a bottom surface 24, and a pair of side surfaces 26. The front surface 21 and the rear surface 22 face each other with the inside of the case body 2 interposed therebetween. Similarly, the top surface 23 and the bottom surface 24 face each other with the inside of the case body 2 interposed therebetween, and the pair of side surfaces 26 face each other with the inside of the case body 2 interposed therebetween. The front surface 21 and the rear surface 22 are formed to be longer in the up-down direction than in the left-right direction. Likewise, the top surface 23 and the bottom surface 24 are formed to be longer in the front-rear direction than in the left-right direction, and the pair of side surfaces 26 are formed to be longer in the up-down direction than in the front-rear direction. In addition to the six surfaces described above, the case body 2 has an inclined surface 27 and inclined surfaces 28a and 28b at positions corresponding to any of corners of the rectangular parallelepiped. The inclined surface 27 is inclined with respect to the front surface 21 and the bottom surface 24 and connects the front surface 21 with the bottom surface 24. Similarly, as shown in FIG. 2, the inclined surface 28a is inclined with respect to the rear surface 22 and the top surface 23 and connects the rear surface 22 with the top surface 23, and the inclined surface 28b is inclined with respect to the rear surface 22 and the bottom surface 24 and connects the rear surface 22 with the bottom surface 24.

The "substantially rectangular parallelepiped shape" of the embodiment relating to the case body 2 is not a rectangular parallelepiped in which all internal angles are 90 degrees, but may also be a shape in which at least one corner of such a rectangular parallelepiped is chamfered like an inclined surface.

The front surface 21 has a light projecting and receiving surface 21a through which light from the light projecting portion 31 or light to the light receiving portion 32 passes. The top surface 23 is adjacent to the front surface 21 and extends in a direction orthogonal to the front surface 21 and the rear surface 22. As shown in FIG. 2 and the like, a plurality of mounting portions 22a for fixing the case body 2 to the outside when the photoelectric sensor 1 is installed are provided on the rear surface 22. The mounting portions 22a are provided on the upper side (the upper side in FIGS. 3(A) and 3(B)) of the rear surface 22 and the lower side (the lower side in FIGS. 3(A) and 3(B)) of the rear surface 22. The plurality of mounting portions 22a have a shape (a protruding portion) which protrudes rearward from a center portion 221 of the rear surface 22. In other words, the center portion 221 of the rear surface 22 has a shape which is recessed forward from the mounting portions 22a. The mounting portion 22a has a mounting hole 22b formed therein. The mounting hole 22b is a hole for fixing using a predetermined fixing member (not shown) when the photoelectric sensor 1 is used. In the example shown in FIG. 1 and the like, the mounting hole 22b is formed to pass through the case body 2 in the left-right direction but is not limited to the shape formed to pass therethrough and can be appropriately changed as long as the case body 2 can be mounted on the outside using a predetermined fixing member.

Figures 3A, 3B:
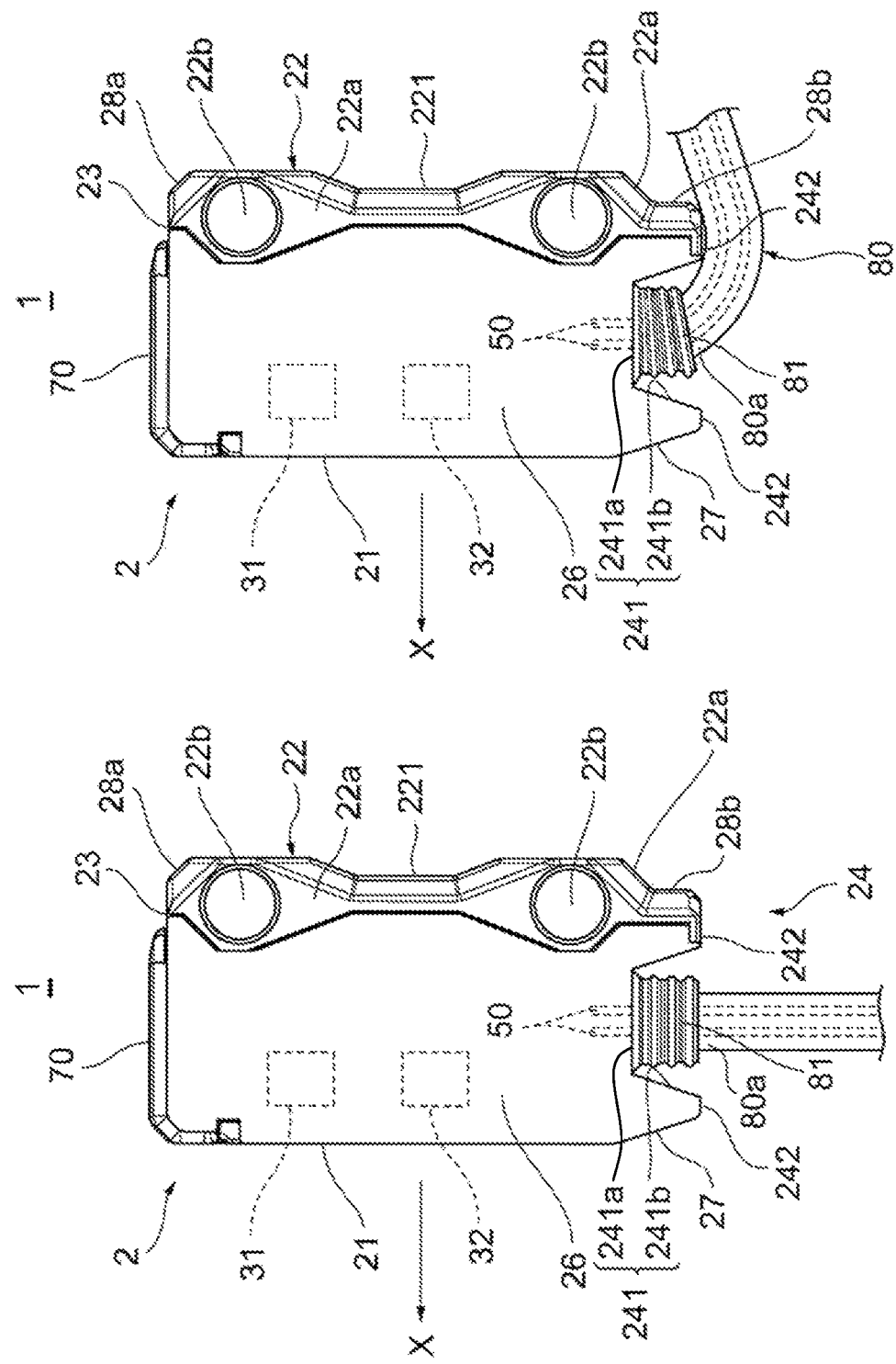
FIGS. 3(A) and 3(B) are views for explaining an example of an installation mode of the photoelectric sensor shown in FIG. 1.

The bottom surface 24 is a surface which connects the front surface 21 and the rear surface 22. The bottom surface 24 has a concave portion 241 formed in a concave shape in a side view which is recessed toward the inside of the case body 2, and a connection surface 242 which extends from an edge of the concave portion 241 toward the front surface 21 side or the rear surface 22 side. As shown in FIGS. 3(A) and 3(B), the connection surface 242 extends in a direction substantially orthogonal to the front surface 21 and the rear surface 22.

As shown in FIGS. 1 to 3(B), the concave portion 241 is defined in a concave shape in a side view by a bottom wall 241a (a bottom surface of the concave portion) and a pair of side walls 241b. The bottom wall 241a extends in a direction substantially orthogonal to the up-down direction (the direction in which the front surface 21 extends). A cable 80 is mounted on the bottom wall 241a. The side walls 241b are wall surfaces which extend toward the inside of the case body 2, are inclined with respect to the bottom wall 241a, and connect the bottom wall 241a with the connection surface 242. As shown in the example of FIG. 3A, in the embodiment, each of the side walls 241b is formed into an inclined surface inclined away from an outer peripheral surface of the cable 80 and away from the bottom wall 241a (from a center portion of the case body 2 toward the outside).

As described above, since the side walls 241b formed into the inclined surface around the bottom wall 241a on which the cable 80 is mounted are provided, when the cable 80 is folded along an outer surface of the case body 2, the cable 80 can be gently folded along the side walls 241b formed into the inclined surface. Therefore, excessive bending of the cable 80 from a portion connected to the case body 2 (a cable connecting portion) is suppressed, and the load applied to the cable connecting portion can be minimized. As a result, breakage of the cable 80 is minimized, and disconnection can also be minimized. The above-described embodiment has a configuration in which the periphery of the cable connecting portion is covered by a part of the case body 2 (the periphery of a region defined by the concave portion 241), in other words, a configuration in which the protruding portion protruding to cover a part of the periphery of the cable connecting portion is provided in the case body 2.

As shown in FIGS. 1 to 3(B), the above-described bottom surface 24 is not limited to the configuration having the concave portion 241 and the connection surface 242. That is, it suffices for the bottom surface 24 to have a portion formed in a concave shape in a side view, and the shapes of the concave portion 241 and the connection surface 242 can be appropriately changed. For example, the bottom surface 24 may be constituted not to have the connection surface 242. Further, as will be described below, the concave portion 241 may be formed on a surface different from the bottom surface 24 without forming the concave portion 241 in the bottom surface 24.

Further, in addition to accommodating the above-mentioned members, it is possible to accommodate a configuration normally provided as a photoelectric sensor (for example, a light projecting and receiving board (hereinafter, also simply referred to as a substrate) or the like on which a light projecting circuit for driving the light projecting element and a light receiving circuit for electrically processing a light receiving signal of the light receiving element is mounted) inside the case body 2.

The cable 80 accommodates, for example, a cord 50 which supplies power from the outside to the light projecting portion 31 and the light receiving portion 32 or transmits a signal electrically processed by the light receiving portion 32 to the outside. An accommodation space for accommodating the cord 50 is provided inside the case body 2. The cord 50 is connected to a substrate (not shown) disposed inside the case body 2, passes through the inside of the case body 2 and the cable 80 connected to the case body 2, and is drawn out to the outside. For example, the cord 50 is configured in a wire shape in which a conductor is covered with an insulating member and is connected to at least one of the light projecting portion 31 and the light receiving portion 32 via a control portion (not shown). The control portion controls light emission of the light projecting portion 31, processes an amount of light received from the light receiving portion 32 and generates an output signal.

In the embodiment, the cable 80 is mounted on the bottom surface 24 of the case body 2. A cable protection member 81 is provided on the cable 80. The cable protection member 81 is provided to cover the periphery (an end portion 80a of the cable) of the portion of the cable 80 connected to the case body 2. For example, when the cable 80 is used in a bent state, it is possible to suppress the cable 80 from being bent from the end portion 80a side by covering the end portion 80a of the cable 80 with the cable protection member 81 as described above, and thus bending durability of the cable 80 can be improved. Further, in the embodiment, the end portion 80a of the cable and the cable protection member 81 are located in the regions partitioned by the concave portion 241. With such a configuration, when the cable 80 is bent, it is possible to limit a bending angle of the end portion 80a of the cable and the cable protection member 81.

Figure 4:
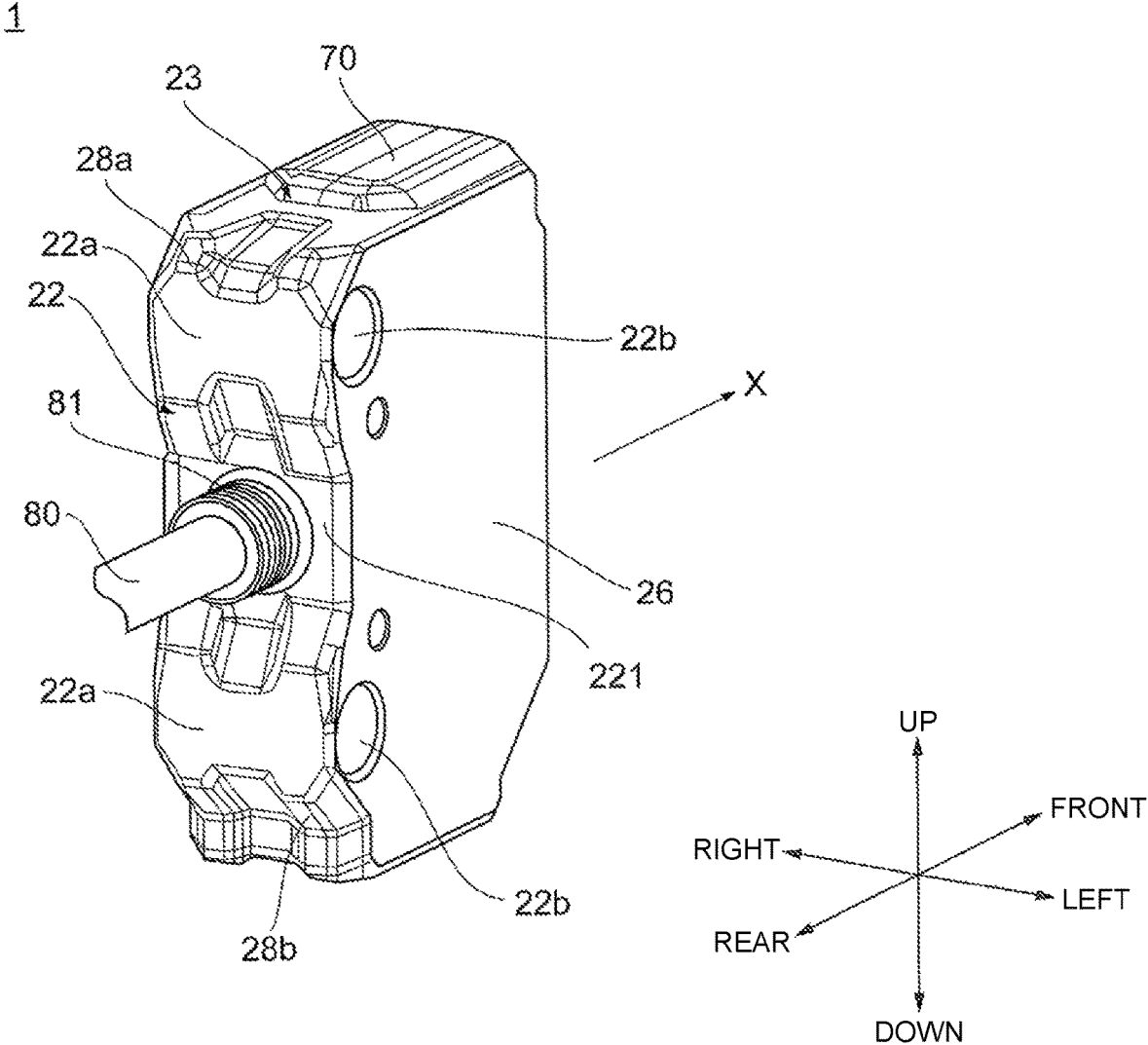
FIG. 4 is a perspective view of a photoelectric sensor according to a modified example when seen from the rear side.

In the above-described embodiment, the concave portion 241 is formed in the bottom surface 24, and the cable 80 is mounted in the concave portion 241, but the disclosure is not limited to this example, and the concave portion 241 may be provided on a surface different from the front surface 21 (for example, the rear surface 22 or the like). For example, as shown in FIG. 4, when the cable 80 is mounted on the rear surface 22, it can be mounted on the center portion 221 of the rear surface 22. As described above, a shape that is recessed toward the front side between the mounting portion 22a on the upper side of the rear surface 22 and the mounting portion 22a on the lower side of the rear surface 22 (that is, the center portion 221) in a side view is provided. In other words, the center portion 221 of the rear surface 22 has a concave shape that is continuous from the mounting portion 22a having the mounting hole 22b for fixing the case body 2. In other words, the mounting portion 22a having a shape protruding toward the rear side is provided on the upper side and the lower side with respect to the center portion 221 of the rear surface 22. That is, when the cable 80 is mounted on the center portion 221 of the rear surface 22, the upper side and the lower side of the cable connection portion (the portion of the cable 80 connected to the case body 2) are covered with the mounting portion 22a protruding rearward from the center portion 221. Thus, when the cable 80 is bent, the cable 80 comes into contact with the mounting portion 22a, and the bending angle of the cable 80 is limited, excessive bending from the cable connection portion can be suppressed.

A display portion 70 is provided on the top surface 23 side of the case body 2. The display portion 70 is turned on in accordance with a power supply state or detection state of the photoelectric sensor 1. For example, the display portion 70 has a power lamp which is turned on when the power is on, and an operation indicator lamp which is turned on when an object to be detected is detected. Each of the power lamp and operation indicator lamp is formed of, for example, an LED and lights up with different display colors.

However, in the photoelectric sensor used for production facilities or the like, since an installation space thereof is limited, the cable connected to the case body may be used in a bent state. Hereinafter, a mode in which the photoelectric sensor is mounted by bending the cable will be described while comparing a configuration of a comparative example with the configuration of the embodiment.

FIGS. 3(A) and 3(B) show an example of an installation mode of the photoelectric sensor 1 according to the embodiment, and FIGS. 5(A) and 5(B) show an example of an installation mode of a photoelectric sensor 100 shown as a comparative example. Specifically, FIG. 3(A) shows an example in which the photoelectric sensor 1 is mounted without bending the cable 80, and FIG. 3(B) shows an example in which the photoelectric sensor 1 is mounted by bending the cable 80. FIG. 5(A) shows an example in which the cable 180 provided in the photoelectric sensor 100 shown as a comparative example is mounted without being bent, and FIG. 5(B) shows an example in which the cable 180 provided in the photoelectric sensor 100 shown as a comparative example is bent and mounted. The photoelectric sensor 100 shown in FIGS. 5(A) and 5(B) does not have a concave portion formed in the case body 120 in a concave shape in a side view, and other configurations and functions are the same as those of the photoelectric sensor 1 of the embodiment described above. That is, as shown in FIGS. 5(A) and 5(B), the photoelectric sensor 100 shown in the comparative example has a configuration in which a light projecting portion 131 or a light receiving portion 132 is accommodated in a substantially rectangular parallelepiped case body 120 having a front surface 121, a rear surface 122, a top surface 123, a bottom surface 124, and a pair of side surfaces 125, and the cable 180 and a cable protection member 181 are mounted on the bottom surface 124 of the case body 120.

In the photoelectric sensor 100 of the comparative example, since the bottom surface 124 on which the cable 180 is mounted is flat, when the cable 180 is bent along the case body 120, it is excessively bent from an end portion 180a side of the cable 180, as shown in FIG. 5(B). That is, the bending angle of the cable 180 is not limited. Therefore, a load applied to the end portion 180a of the cable 180 becomes excessive, and the cable 180 may be damaged.

In contrast to the comparative example, in the photoelectric sensor 1 of the embodiment shown in FIGS. 3(A) and 3(B), when the cable 80 connected to the bottom surface 24 of the case body 2 is bent, an outer peripheral surface of the cable 80 comes into contact with the case body 2 (a peripheral portion of the connection surface 242 of the case body 2) and the bending angle of the cable 80 is limited. Thus, excessive bending from the end portion 80a of the cable 80 is suppressed, and the load applied to the end portion 80a of the cable 80 can be suppressed. As a result, breakage of the cable 80 is suppressed, and disconnection can be suppressed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

APPENDIX

A photoelectric sensor 1 having at least one of a light projecting portion 31 which emits light to a front space and a light receiving portion 32 which receives light from a front zone, the photoelectric sensor 1 including:
a case body 2 having an accommodation space which accommodates at least one of the light projecting portion 31 and the light receiving portion 32 therein, and
a cable 80 which accommodates a cord 50 connected via a control portion to at least one of the light projecting portion 31 and the light receiving portion 32,
wherein a concave portion 241 recessed toward an inside of the case body 2 is provided in an outer surface of the case body 2, and
the cable 80 is mounted in the concave portion 241.

What is claimed is:
1. A photoelectric sensor having at least one of a light projecting portion which emits light to a front space and a light receiving portion which receives light from a front zone, the photoelectric sensor comprising:
a case body having an accommodation space which accommodates at least one of the light projecting portion and the light receiving portion therein, and
a cable which accommodates a cord connected via a control portion to at least one of the light projecting portion and the light receiving portion,
wherein a concave portion which is recessed toward an inside of the case body is provided in an outer surface of the case body, and the cable is mounted in the concave portion,
wherein the concave portion is provided on one of outer surfaces of the case body other than a front surface having a light projecting and receiving surface through which the light from the light projecting portion and the light to the light receiving portion pass, the outer surface on which the concave portion is provided further has a connection surface extending from an edge of the concave portion toward another one of the outer surfaces of the case body other than the front surface, and the connection surface is parallel or orthogonal to the front surface,
wherein an extending direction of the cord of the cable is perpendicular to the connecting surface when the cable is mounted in an unbent state, and an outer peripheral surface of the cable comes into contact with the connection surface when the cable is mounted in a bent state.

2. The photoelectric sensor according to claim 1, wherein the concave portion is provided on a surface which connects the front surface and a rear surface located on a side opposite to the front surface.

3. The photoelectric sensor according to claim 1, wherein the case body has a rear surface located on a side opposite to the front surface,
   a protruding portion having a shape protruding rearward is provided on an upper side and a lower side with respect to a center portion of the rear surface, and
   the cable is mounted on the center portion of the rear surface.

4. The photoelectric sensor according to claim 1, wherein a cable protection member which covers a periphery of an end portion of the cable is provided at the end portion of the cable, and
   the end portion of the cable and the cable protection member are located in the concave portion.

5. The photoelectric sensor according to claim 2, wherein a cable protection member which covers a periphery of an end portion of the cable is provided at the end portion of the cable, and
   the end portion of the cable and the cable protection member are located in the concave portion.

6. The photoelectric sensor according to claim 3, wherein a cable protection member which covers a periphery of an end portion of the cable is provided at the end portion of the cable, and
   the end portion of the cable and the cable protection member are located in the concave portion.

7. The photoelectric sensor according to claim 1, wherein the concave portion is partitioned by a bottom wall and a pair of side walls, and
   the pair of side walls are inclined surfaces which are inclined with respect to the bottom wall.

8. The photoelectric sensor according to claim 2, wherein the concave portion is partitioned by a bottom wall and a pair of side walls, and
   the pair of side walls are inclined surfaces which are inclined with respect to the bottom wall.

9. The photoelectric sensor according to claim 3, wherein the concave portion is partitioned by a bottom wall and a pair of side walls, and
   the pair of side walls are inclined surfaces which are inclined with respect to the bottom wall.

10. The photoelectric sensor according to claim 4, wherein the concave portion is partitioned by a bottom wall and a pair of side walls, and
    the pair of side walls are inclined surfaces which are inclined with respect to the bottom wall.

11. The photoelectric sensor according to claim 5, wherein the concave portion is partitioned by a bottom wall and a pair of side walls, and
    the pair of side walls are inclined surfaces which are inclined with respect to the bottom wall.

12. The photoelectric sensor according to claim 6, wherein the concave portion is partitioned by a bottom wall and a pair of side walls, and
    the pair of side walls are inclined surfaces which are inclined with respect to the bottom wall.

* * * * *